United States Patent [19]

Okada

[11] Patent Number: 5,727,114
[45] Date of Patent: Mar. 10, 1998

[54] IMAGE SIGNAL RECORDING AND REPRODUCING SYSTEM

[75] Inventor: Masaki Okada, Kanagawa-ken, Japan

[73] Assignee: Canon Kabushiki Kaisha, Tokyo, Japan

[21] Appl. No.: 279,699

[22] Filed: Jul. 25, 1994

Related U.S. Application Data

[63] Continuation of Ser. No. 823,889, Jan. 22, 1992, abandoned.

[30] Foreign Application Priority Data

Feb. 6, 1991 [JP] Japan ................................. 3-015345
Feb. 6, 1991 [JP] Japan ................................. 3-015346

[51] Int. Cl.$^6$ ................................................ H04N 5/76
[52] U.S. Cl. ........................... 386/95; 386/46; 358/906
[58] Field of Search ................................. 358/335, 906, 358/342; 360/14.1, 14.3, 33.1; 348/730; 386/46, 95, 96, 98, 107, 117, 62, 65; H04N 5/76

[56] References Cited

U.S. PATENT DOCUMENTS

| | | | |
|---|---|---|---|
| 4,420,773 | 12/1983 | Toyoda et al. | 358/909 |
| 4,731,655 | 3/1988 | Lee et al. | 348/730 |
| 5,016,107 | 5/1991 | Sasson et al. | 358/909 |
| 5,016,124 | 5/1991 | Fukushima et al. | 358/906 |
| 5,132,807 | 7/1992 | Takimoto et al. | 358/335 |
| 5,231,511 | 7/1993 | Kodama et al. | 358/906 |

*Primary Examiner*—Thai Tran
*Assistant Examiner*—Huy Neuyen
*Attorney, Agent, or Firm*—Robin, Blecker, Daley and Driscoll

[57] ABSTRACT

An image signal recording and reproducing system for recording an image signal and an information signal corresponding to the image signal together on a recording medium and for reproducing these recorded signals from the recording medium is arranged to include a power supply circuit which independently supplies power to an information data generating circuit, to detect the power supplied from the power supply circuit to the information data generating circuit, to cause the information data generating circuit to output information data of predetermined contents according to a result of the detection, to record an information signal conforming to the contents of the information data generating by the information data generating circuit on the recording medium along with the image signal, and to make a display conforming to the contents of the information data. This arrangement not only enables the system to prevent any erroneously information signal from being recorded along with the image signal due to consumption of the power supplied from the power supply circuit and also promptly enables the operator to know a consumed state of the electric power of the power supply circuit.

51 Claims, 6 Drawing Sheets

IMAGE SIGNAL RECORDING AND REPRODUCING SYSTEM

This is a continuation application under 37 CFR 1.62 of prior application Ser. No. 07/823,889, filed Jan. 22, 1992, abandoned.

BACKGROUND OF THE INVENTION

1. Field of the Invention

This invention relates to an image signal recording and reproducing system for recording an image signal on a recording medium together with an information signal which corresponds to the image signal and for reproducing the image signal and the information signal recorded on the recording medium.

2. Description of the Related Art

The known image signal recording and reproducing systems of the kind recording, on a recording medium, an image signal together with an information signal corresponding to the image signal and reproducing the image signal and the information signal recorded on the recording medium include, for example, an electronic still video camera system.

The electronic still video camera system is arranged to record on a magnetic disc a still image signal obtained by shooting together with information on the date of shooting including the year, month and day or the time of shooting including hour, minute and second; and to reproduce the still image signal and the corresponding information recorded on the magnetic disc.

The electronic still video camera system comprises a camera part which takes the image of an object and generates a still image signal; a recording signal processing part which converts the still image signal generated at the camera part into a recording signal; a recording and reproducing part which records and reproduces, on and from a magnetic disc, the recording signal formed by the recording signal processing part; a reproduced signal processing part which restores the reproduced signal to the original still image signal; and a control part which controls the actions of these parts.

The above-stated control part is arranged to generate an information signal indicating, for example, the date of shooting such as year, month and day or the time of shooting such as hour, minute and second corresponding to the still image signal generated at the camera part. This information signal is multiplexed with the recording signal at the recording signal processing part before recording on the magnetic disc at the recording and reproducing part. The signals thus recorded on the magnetic disc are reproduced by the recording and reproducing part. The information signal is arranged to be separated at the reproduced signal processing part and then to be restored to the data such as the date or time of shooting at the control part.

A clock signal is supplied to the control part from a clock circuit. A subordinate power source is arranged to supply power solely to the clock circuit to enable the clock circuit to independently operate even in the event of cutoff of power supply from a main power source which is arranged to supply power to each of the various parts. In synchronism with the clock signal supplied from the clock circuit, the control part outputs such information data that indicates a date including the year, month and day or time including hour, minute and second. The information data is supplied to the recording signal processing part.

At the recording signal processing part, the information data supplied from the control part is DPSK (differential phase shift keying) modulated to form an index signal (hereinafter referred to as an ID signal). The ID signal thus formed is frequency-multiplexed with the recording signal.

Since the electronic still video camera system is arranged to be portable, dry element batteries or storage batteries are employed as the main power source and the subordinate power source. The power consumption by the clock circuit is very small. Therefore, the battery of the subordinate power source does not have to be frequently replaced as compared with that of the main power source. The subordinate power source battery is set for a long period of service (one year, for example) in most cases.

Further, the system is not arranged to display the remaining amount of power of the subordinate power source battery nor to make any warning display for informing the operator of a diminished amount of power of the battery. Therefore, when a diminished amount of power of the battery of the subordinate power source causes the clock circuit to abnormally operate to cause the control part to generate information data indicating an erroneous date or time of shooting, the operator tends to be unaware of the abnormality. Under such a condition, the erroneous date or time of shooting is recorded on the magnetic disc along with the still image signal.

SUMMARY OF THE INVENTION

It is a general object of this invention to provide an image signal recording and reproducing system which is capable of solving the above-stated problem.

It is a more specific object of the invention to provide an image information recording system which is capable of preventing any malfunction caused by the consumption of power supplied from the power source.

Under this object, an image information recording system arranged as an embodiment of this invention to record, on a recording medium, image information and other information which corresponds to the image information comprises data generating means for generating data corresponding to the above-stated other information; power supply means for independently supplying power to the data generating means; data generation control means arranged to cause the data generating means to output data corresponding to information of predetermined contents in a case where the power supplied from the power supply means to the data generating means is less than a given value; and recording means for recording information conforming to contents of data generated by the data generating means on the recording medium along with the image information.

It is another object of the invention to provide an image signal recording system which is capable of preventing any erroneous information signal from being recorded along with an image signal on a recording medium due to consumption of power supplied from a power source.

Under that object, an image signal recording system arranged as another embodiment of the invention to record an image signal and an information signal corresponding to the image signal together on a recording medium comprises information data generating means for generating information data; power supply means for independently supplying power to the information data generating means; data generation control means arranged to cause the information data generating means to output information data of predetermined contents in a case where the power supplied from the power supply means to the information data generating means is less than a given value; and recording means arranged to generate an information signal which conforms to contents of the information data generated by the information data generating means and to record the information signal on the recording medium along with the image signal.

It is a further object of the invention to provide an image information recording system which is capable of promptly informing the operator of the occurrence of any malfunction of the system due to consumption of power supplied from a power source.

Under the above-stated object, an image information recording system arranged as an embodiment of this invention to record image information and other information corresponding to the image information together on a recording medium comprises data generating means for generating data corresponding to the above-stated other information; power supply means for independently supplying power to the data generating means; action instructing means for instructing the system to perform each action; data generation control means arranged to detect a value of power supplied from the power supply means to the data generating means according to the timing of an instruction given for a specific action by the action instructing means and to cause the data generating means to output data of predetermined contents according to a result of the detection; and display means for displaying information conforming to contents of data generated by the data generating means.

It is a still further object of the invention to provide an image signal recording and reproducing system which is capable of promptly informing the operator of a state of consumption of power supplied from a power source.

Under the above-stated object, an image signal recording and reproducing system arranged as an embodiment of the invention to record an image signal on a recording medium together with an information signal corresponding to the image signal and to reproduce the image signal and the information signal recorded on the recording medium comprises: information data generating means for generating information data; power supply means for independently supplying power to the information data generating means; action instructing means for instructing the system to perform each action; data generation control means arranged to detect the value of power supplied from the power supply means to the information data generating means according to the timing of an instruction for a specific action given by the action instructing means and to cause the information data generating means to output information data of predetermined contents according to a result of the detection; and display means for making a display conforming to contents of the information data generated by the information data generating means.

These and other objects and features of this invention will become apparent from the following detailed description of embodiments thereof taken in connection with the accompanying drawings.

DETAILED DESCRIPTION OF THE PREFERRED EMBODIMENTS

Figure 1:
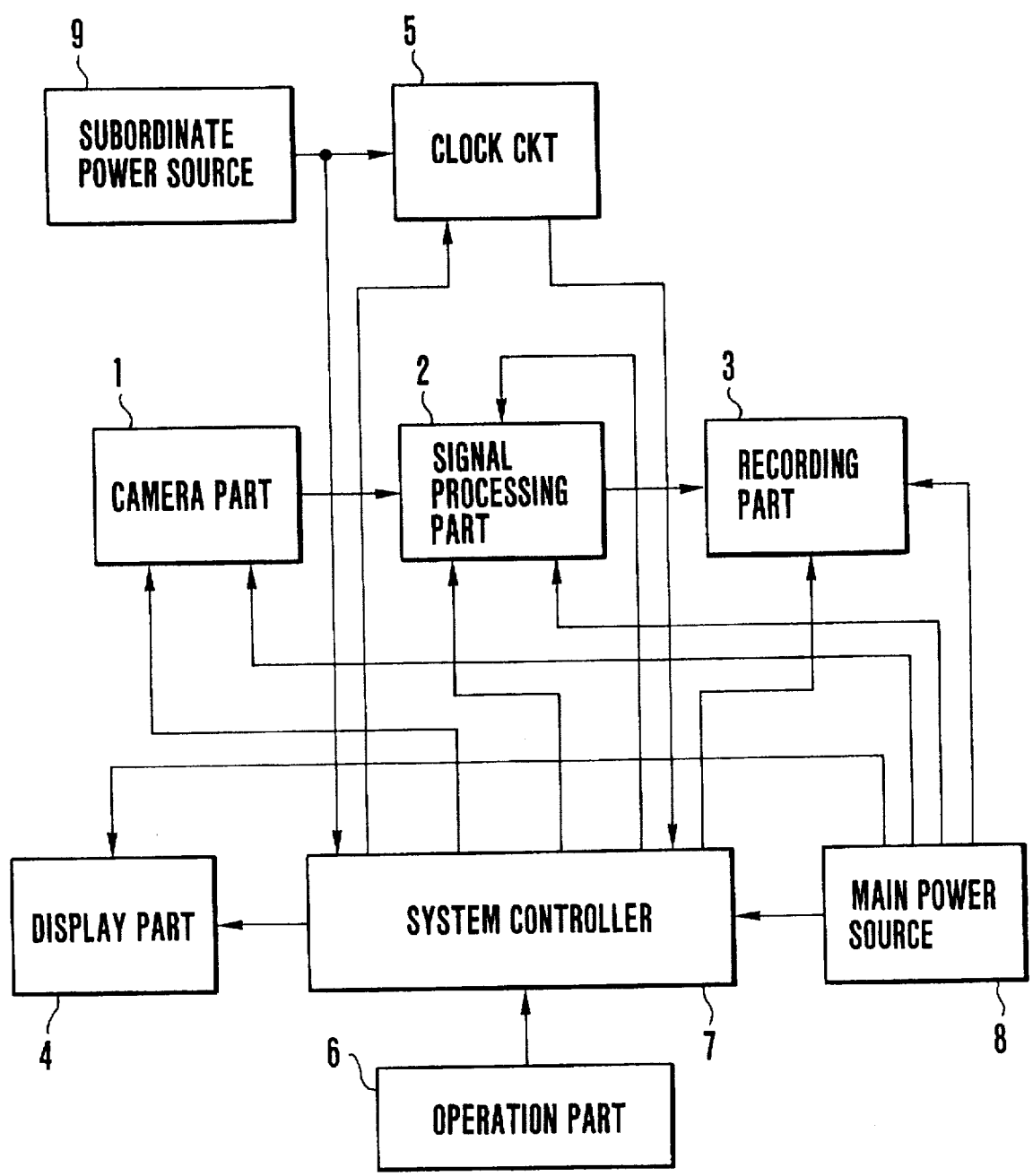
FIG. 1 is a block diagram showing in outline the arrangement of a recording apparatus in an electronic still video camera system to which this invention is applied as a first embodiment thereof.
Figure 2:
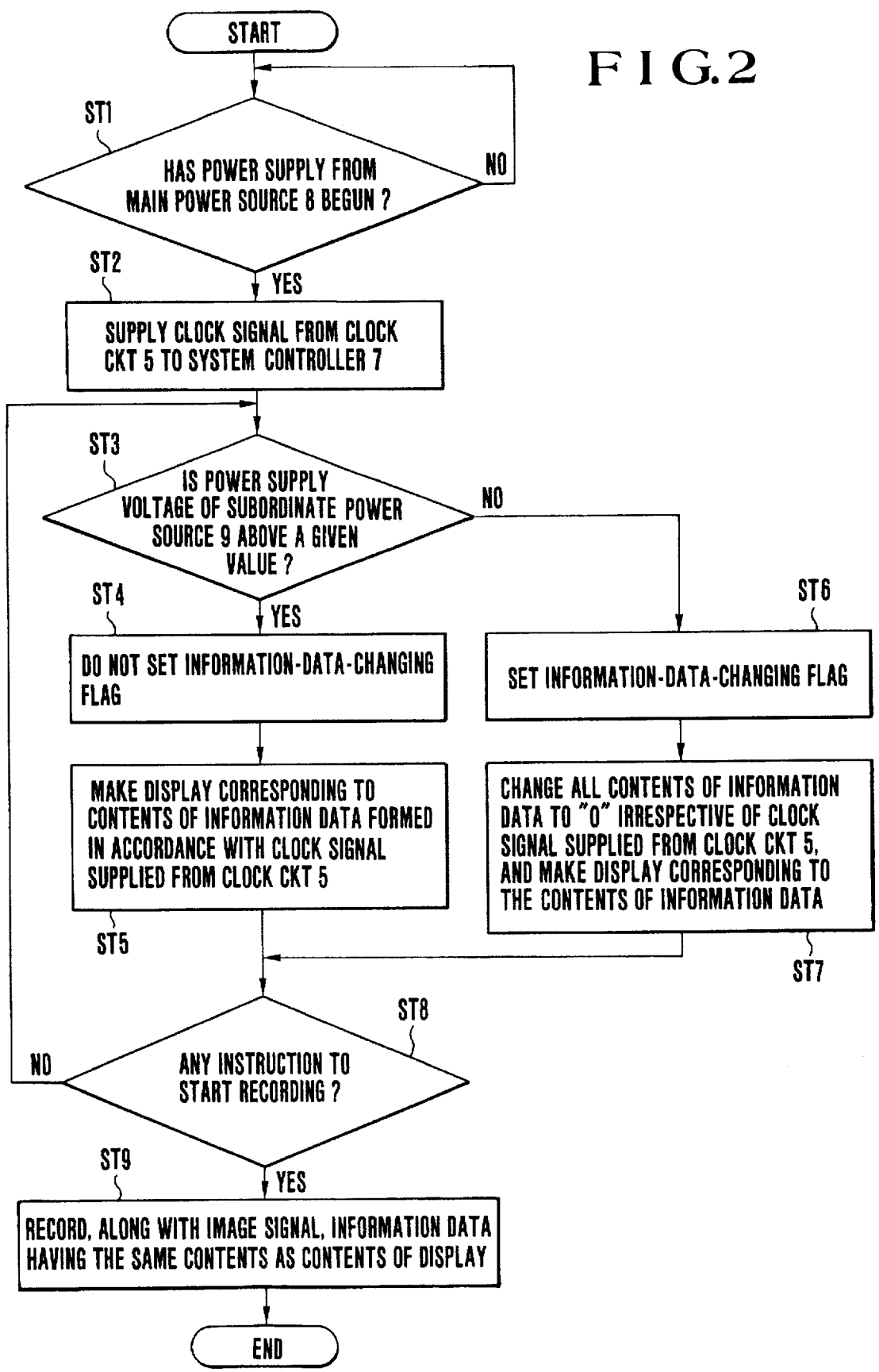
FIG. 2 is a flow chart showing the information data recording operation of the recording apparatus shown in FIG. 1.

A first embodiment of the invention is described below with reference to FIG. 1 which shows in outline the arrangement of a recording apparatus included in an electronic still video camera system embodying the invention as the first embodiment thereof and FIG. 2 which shows in a flow chart the information data recording operation of the recording apparatus shown in FIG. 1:

Referring to FIG. 1, a camera part 1 includes a photo-taking lens; a shutter mechanism; a shutter driving circuit for driving the shutter mechanism; a diaphragm mechanism; a diaphragm driving circuit for driving the diaphragm mechanism; an image sensor which converts the image of and object taken by the photo-taking lens into an electrical signal; an image sensor driving circuit which drives the image sensor; and a matrix circuit which forms a luminance signal and color-difference signals of two kinds from the electrical signal outputted from the image sensor. At the camera part 1, the shutter mechanism and the diaphragm mechanism control an exposure to the object image taken by the photo-taking lens. The object image is converted into an electrical signal by the image sensor. The matrix circuit then forms and outputs the luminance signal and the color-difference signals of two kinds which correspond to the object image.

A signal processing part 2 includes a luminance signal frequency modulation circuit which is arranged to frequency-modulate the luminance signal outputted from the matrix circuit of the camera part 1 and to output a frequency-modulated luminance signal; a line-sequential conversion circuit which is arranged to make the color-difference signals of two kinds outputted from the matrix circuit into a line-sequential state and to output a line-sequential color-difference signal; a line-sequential color-difference-signal frequency modulation circuit which is arranged to frequency-modulate the line-sequential color-difference signal formed by the line-sequential conversion circuit and to output a frequency-modulated line-sequential color-difference signal; an ID signal forming circuit which is arranged to DPSK-modulate information data supplied from a system controller 7 and to output an ID signal; and a frequency multiplexing circuit which forms a recording signal by frequency-multiplexing the frequency-modulated luminance signal, the frequency-modulated line-sequential color-difference signal and the ID signal.

A recording part 3 includes a rotatory driving mechanism for rotating a magnetic disc; a magnetic head for recording the recording signal formed by the frequency multiplexing circuit of the signal processing part 2 on the magnetic disc which is rotated by the rotatory driving mechanism; and a magnetic-head moving mechanism for moving the magnetic head radially over the magnetic disc.

A display part 4 includes a display device for displaying the operating state of the apparatus; and a display driving circuit for driving the display device.

A clock circuit 5 is arranged to supply the system controller 7 with a clock signal which is used by the system controller 7 as reference in forming information data corresponding to the date (year, month and day) or time (hour, minute and second) of shooting.

An operation part 6 has operation keys for starting and stopping the recording operation; for setting the date or time of shooting; and so on. The operation part 6 is thus arranged to instruct the system controller 7 to start or stop the recording-operation, to set the date or time of shooting and so on.

The system controller 7 operates in accordance with instructions given by operating the operation keys of the operation part 6. The system controller 7 is thus arranged to control the setting action or the operation of each of the above-stated parts; to generate information data indicating the date or time of shooting in accordance with the clock signal supplied from the clock circuit 5; to supply the information data to the signal processing part 2; to find if the power supply voltage of power supplied from a subordinate power source 9 has reached a given value; and, if not, to change all the contents of the above-stated information data to "0", because, in such a case, an erroneous clock signal might be outputted from the clock circuit 5.

A main power source 8 is arranged to supply power to each part of the apparatus except the clock circuit 5. Meanwhile, the subordinate power source 9 is arranged to supply power to the clock circuit 5.

The recording operation on the information data of the recording apparatus shown in FIG. 1 is described below with reference to the flow chart of FIG. 2:

Referring to FIG. 1, the clock circuit 5 has a power supply constantly from the subordinate power source 9. The power supply enables the clock circuit 5 to constantly operate to supply a clock signal to the system controller 7 irrespective of other states of the apparatus.

Steps ST1 and ST2 (FIG. 2): When the power is supplied from the main power source 8 to each part in response to the operation of a main-power-source operation key of the operation part 6, the system controller 7 instructs the clock circuit 5 to supply the clock signal generated by the clock circuit 5 to the system controller 7. Further, in a case where an operation key of the operation part 6 provider for setting the date or time of shooting is operated, the system controller 7 serially changes, in accordance with the clock signal supplied from the clock circuit 5, the contents of the information data from the setting value.

Steps ST3, ST4 and ST5 (FIG. 2): The power supplied from the subordinate power source 9 to the clock circuit 5 is also supplied to the system controller 7. The system controller 7 makes a check to detect if the power supply from the subordinate power source 9 is above a given power supply voltage required for normally operating the clock circuit 5. If so, the system controller 7 judges that the clock signal supplied from the clock circuit 5 has no error and does not set an information-data-changing flag. The system controller 7 then causes the display part 4 to display the date or time of shooting corresponding to the contents of the information data which is formed by the system controller 7.

Steps ST3, ST6 and ST7 (FIG. 2): If the power supply voltage of the power from the subordinate power source 9 is found to have not reached the given value at the step ST3, some error might have been caused to occur in the clock signal supplied from the clock circuit 5. In this case, the information-data-changing flag is set at the system controller 7. All the contents of the information data formed at the system controller 7 are then changed to data indicating "0" irrespective of the clock signal supplied from the clock circuit 5. At the display part 4, all the parts of the date or time of shooting are displayed as "0".

Steps ST8 and ST9 (FIG. 2): When an instruction is given to start recording by operating a recording start instructing operation key after the display is made at the display part 4 as mentioned above, the system controller 7 controls a sequence of recording actions to be performed by the camera part 1, the signal processing part 2 and the recording part 3. The system controller 7 then supplies the signal processing part 2 with the information data corresponding to the contents of the date or time of shooting displayed at the display part 4. At the signal processing part 2, an ID signal is formed by DPSK-modulating the information data supplied from the system controller 7. The ID signal thus formed is frequency-multiplexed with a still image signal which has been generated by the camera part 1 and undergone a frequency modulation process and a line-sequential converting process performed at the signal processing part 2. The frequency-multiplexed signals are recorded on the magnetic disc at the recording part 3.

Therefore, if the power supply voltage of the subordinate power source 9 is above the given value, an ID signal having the same contents as those of the information data generated by the system controller 7 according to the clock signal supplied from the clock circuit 5 is recorded on the magnetic disc along with the still image signal. If this power supply voltage is less than the given value, a display is made with all the contents of the display showing "0" and an ID signal having all the contents thereof indicating "0" is recorded on the magnetic disc along with the still image signal. The display thus gives the operator of the apparatus a warning that the power supply voltage of the subordinate power source 9 is too low. Meanwhile, any ID signal having incorrect contents due to the drop of the power supply voltage is prevented from being recorded along with the still image signal.

The first embodiment described above is arranged as described above to record the ID signal on the magnetic disc along with the still image signal with the contents of the ID signal indicating "0" if the power supply voltage of the subordinate power source 9 fails to reach a given value. This arrangement, however, may be changed to record an ID signal having all the contents thereof in blank states on the magnetic disc along with the still image signal.

Further, in the first embodiment described, the system controller forms the information data indicating the date (year, month and day) or time (hour, minute and second) of shooting in accordance with the clock signal supplied from the clock circuit 5. However, in a case where the system controller is arranged only to form the information data indicating the year, month, day, hour and minute of shooting in accordance with the clock signal, information data indicating "00" may be generated as data for second and always displayed as "00" at the display part 4, and the contents of an ID signal indicating second may be always recorded as "00" along with the still image signal.

The arrangement of the first embodiment described above enables an image signal recording system to be capable of preventing any erroneous information that is caused by an excessively consumed state of the battery from being recorded on the recording medium in a state of being multiplexed with the image signal.

Figure 3:
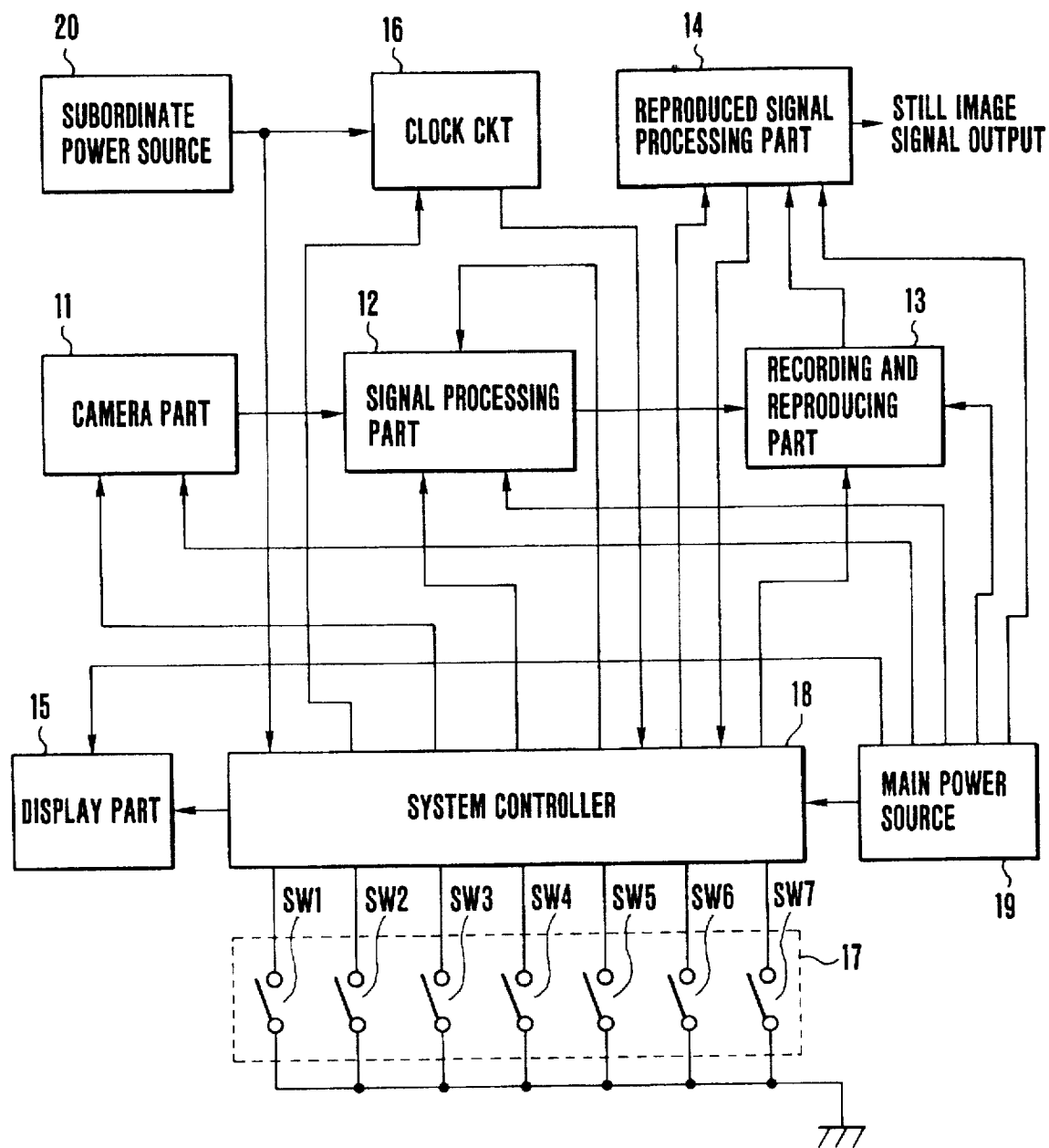
FIG. 3 is a block diagram showing in outline the arrangement of a recording and reproducing apparatus in an electronic still video camera system to which this invention is applied as a second embodiment thereof.
Figure 4:
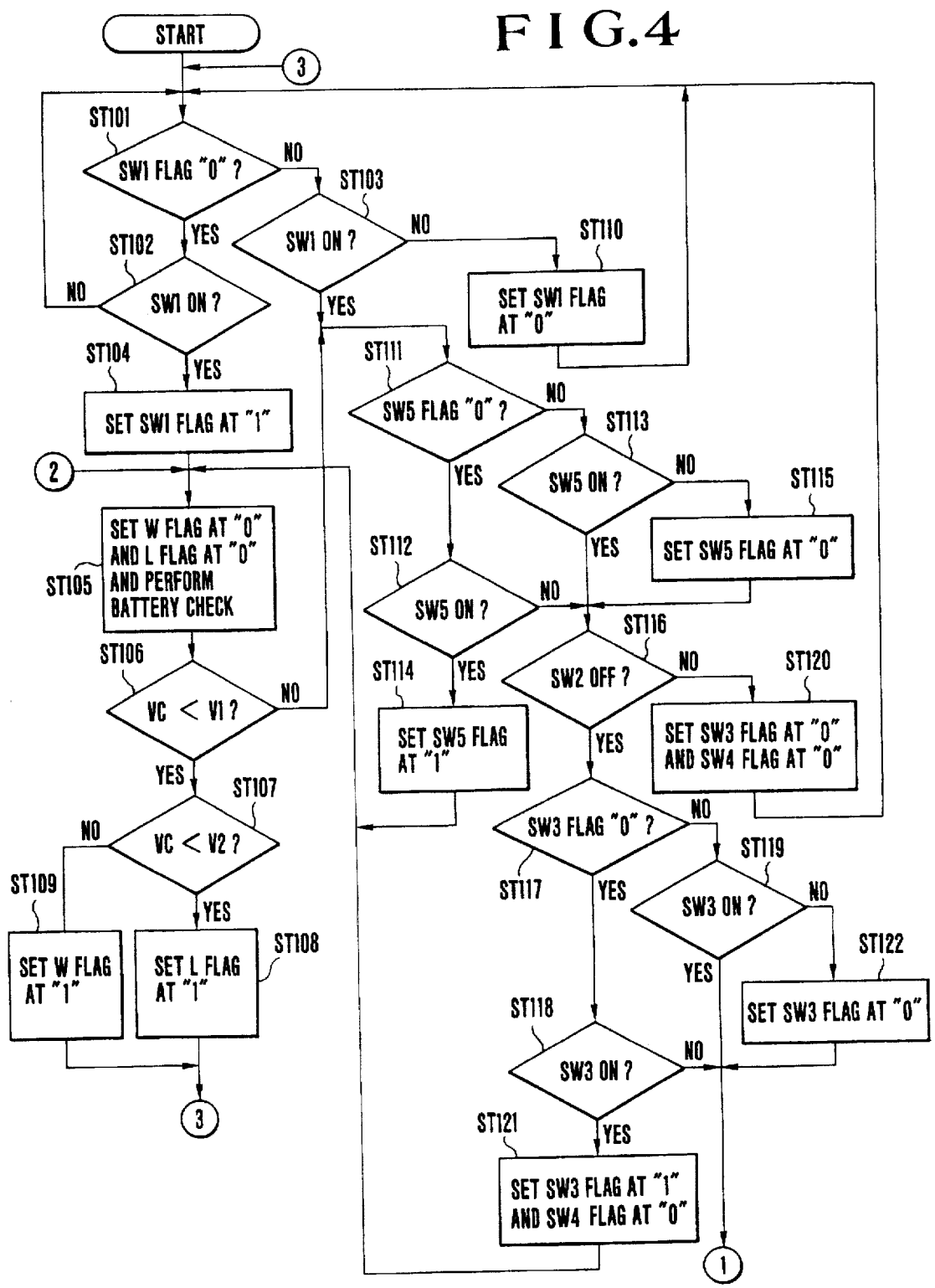
FIG. 4 is a flow chart showing the operation of the recording and reproducing apparatus shown in FIG. 3.
Figure 5:
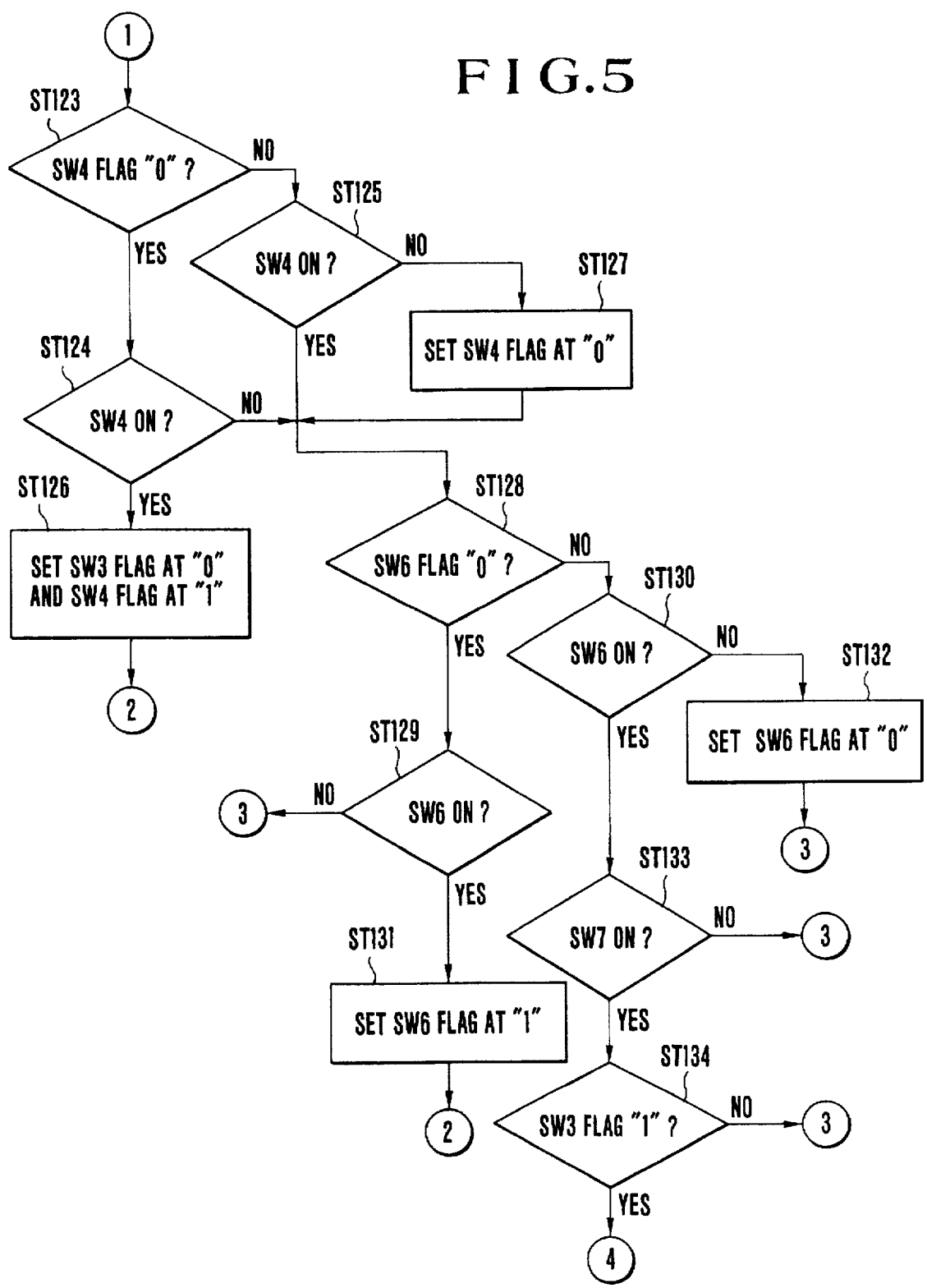
FIG. 5 is another flow chart showing the operation of the recording and reproducing apparatus shown in FIG. 3.
Figure 6:
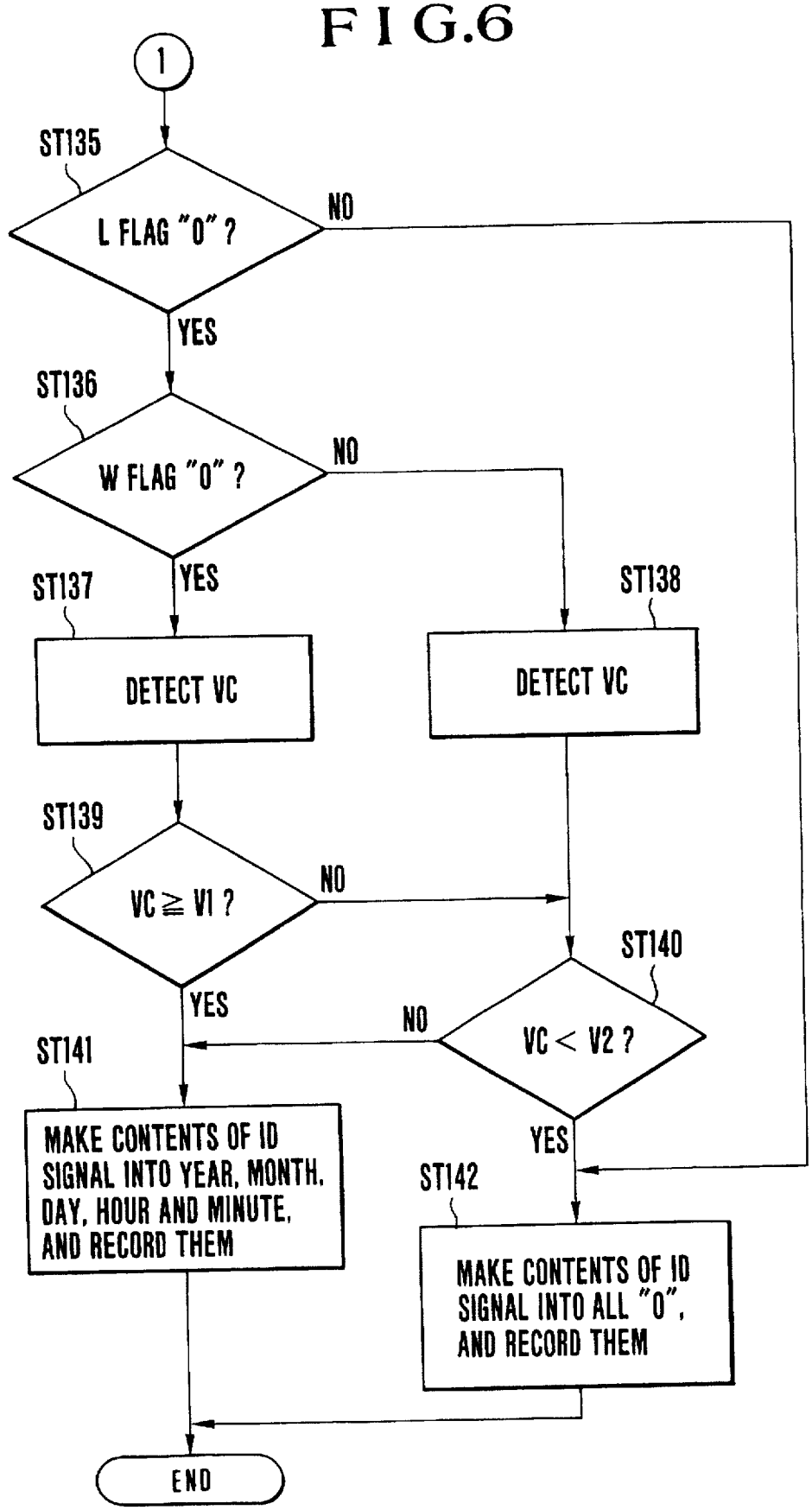
FIG. 6 is a flow chart further showing the operation of the recording and reproducing apparatus shown in FIG. 3.

A second embodiment of this invention is described as follows: FIG. 3 shows in outline the arrangement of a recording and reproducing apparatus in an electronic still video camera system which is arranged as the second embodiment of the invention. FIGS. 4, 5 and 6 are flow charts showing the operation of the recording and reproducing apparatus of FIG. 3.

Referring to FIG. 3, a camera part 11 includes a phototaking lens; a shutter mechanism; a shutter driving circuit fox driving the shutter mechanism; a diaphragm mechanism; a diaphragm driving circuit for driving the diaphragm mechanism; an image sensor which converts the image of an object taken by the photo-taking lens into an electrical signal; an image sensor driving circuit for driving the image sensor; and a matrix circuit which forms a luminance signal and color-difference signals of two kinds from the electrical signal outputted from the image sensor. At the camera part 11, an exposure to the object image taken by the phototaking lens is controlled by the shutter and diaphragm mechanisms and is converted into an electrical signal by the image sensor. The matrix circuit then forms and outputs the luminance signal and the two kinds of color-difference signals which correspond to the image of the object.

A recording signal processing part 12 includes a luminance-signal frequency modulating circuit which is arranged to frequency-modulate the luminance signal outputted from the matrix circuit of the camera part 11 and to output a frequency-modulated luminance signal; a line-sequential converting circuit which is arranged to make the two kinds of color-difference signals outputted from the matrix circuit into a line-sequential state and to output a line-sequential color-difference signal; a line-sequential color-difference signal frequency modulating circuit which is arranged to frequency-modulate the line-sequential color-difference signal formed by the line-sequential converting circuit and to output a frequency-modulated line-sequential color-difference signal; an ID signal forming circuit which is arranged to DPSK-modulate information data supplied from a system controller 18 and to output an ID signal; and a frequency multiplexing circuit which forms a recording signal by frequency-multiplexing the frequency-modulated luminance signal, the frequency-modulated line-sequential color-difference signal and the ID signal.

A recording and reproducing part 13 includes a rotatory driving mechanism for rotating a magnetic disc; a magnetic head for recording and reproducing the recording signal formed by the frequency multiplexing circuit of the recording signal processing part 12 on and from the magnetic disc rotated by the rotatory driving mechanism; and a magnetic-head moving mechanism which moves the magnetic head radially over the magnetic disc.

A reproduced signal processing part 14 includes a separation circuit which separates the frequency-modulated luminance signal, the frequency-modulated line-sequential color-difference signal and the ID signal from a signal reproduced by the recording and reproducing part 3; a luminance-signal frequency demodulating circuit which restores the luminance signal to its original state by frequency-demodulating the frequency-modulated luminance signal; a line-sequential color-difference signal frequency demodulating circuit which restores the frequency-modulated line-sequential color-difference signal to its original state by frequency-demodulating it; a simultaneous converting circuit which restores the two kinds of color-difference signals to a simultaneous state by processing the line-sequential color-difference signal restored by the line-sequential color-difference frequency demodulating circuit; a DPSK demodulator which restores the information data to its original state by DPSK-demodulating the ID signal; a character image signal generator which generates a character image signal according to the contents of the information data restored by the DPSK demodulator; and a frequency multiplexing circuit which is arranged to frequency-multiplex the luminance signal, the two kinds of color-difference signals and the character image signal and to generate and output a still image signal with the character image signal inserted therein.

A display part 15 includes a display device for displaying the operating state of the apparatus; and a display driving circuit for driving the display device. A clock circuit 16 is arranged to supply the system controller 18 with a clock signal which serves as reference to be used by the system controller 18 in forming information data corresponding to the date (year, month and day) or time (hour, minute and second) of shooting.

An operation part 17 includes a switch SW1 for instructing the apparatus to make a check for the remaining amount of the electric power of a main power source 19; a switch SW2 for giving an instruction to inhibit acceptance of all instructions given by other switches; a switch SW3 for instructing the apparatus to operate in a recording mode; a switch SW4 for instructing the apparatus to operate in a reproduction mode; a switch SW5 for indicating that a magnetic disc is loaded on the recording and reproducing part 3 in a normal position; a switch SW6 for instructing the apparatus to cancel a standby state for recording or reproduction in the recording or reproduction mode; and a switch SW7 for instructing the apparatus to begin recording in the recording mode. The operation part 17 is thus arranged to instruct the system controller 18 to begin or stop recording or reproduction.

The system controller 18 is arranged to control the setting positions and the actions of the various parts in accordance with the instructions given by operating the switches at the operation part 17. In addition to that, the system controller 18 is arranged to generate information data indicating the date or time of shooting in accordance with the clock signal supplied from the clock circuit 16; to supply the information data to the recording signal processing part 12; to find if the power supply voltage of power from a subordinate power source 20 has reached a given value at a timing which will be described later herein; and, if not, to change all the contents of the above-stated information data to "0", because an erroneous clock signal might be outputted from the clock circuit 16.

The main power source 19 supplies power to all the parts except the clock circuit 16. The subordinate power source 20 supplies power to the clock circuit 16.

In the apparatus of FIG. 3, the clock circuit 16 constantly receives a power supply from the subordinate power source 20 and is thus enabled to constantly operate to constantly supply the clock signal to the system controller 18 irrespective of other states of the apparatus.

Further, at the system controller 18, flags including an SW1 flag, an SW2 flag, an SW3 flag, an SW4 flag, an SW5 flag, an SW6 flag and an SW7 flag are arranged to indicate respectively the operating states of the switches SW1 to SW7 in such a manner that, each of the flags is set at "1" when the corresponding switch is operated and at "0" when the corresponding switch is not operated. The system controller 18 thus controls the state of each part according to the state of the applicable flag.

When power is supplied to each part from the main power source 19 with a main-power-source switch (not shown) operated, the system controller 18 instructs the clock circuit 16 to supply the clock signal generated by the clock circuit 16 to the system controller 18.

Further, when a setting switch (not shown) which is provided for setting the date or time of shooting is operated at the operation part 17, the system controller 18 revises the contents of the information data one after another, in accordance with the clock signal supplied from the clock circuit 16, starting from a Value set by the switch operation.

The power supplied from the subordinate power source 20 to the clock circuit 16 is supplied also to the system controller 18. The system controller 18 detects the voltage value VC of the power supply from the subordinate power source 20. If the power supply voltage value VC is found to be lower than a given voltage value (hereinafter referred to as a second voltage value V2) which is required for the generation of a normal clock signal at the clock circuit 16, an L flag is set at "1" and if the power supply voltage value VC is higher than the second voltage value V2, the L flag is set at "0". In addition to the L flag, the system controller 18 has a W flag. The W flag is arranged to be set at "1" if the power supply voltage VC is found to be such a value that, at present, permits the generation of the normal clock signal but is lower than a first voltage value V1 and will soon reach the second voltage value V2, and to be set at "0" if the voltage VC is higher than the first voltage value V1.

The operation of the recording and reproducing apparatus of FIG. 3 is described as follows with reference to FIGS. 4, 5 and 6 which are flow charts:

Referring to FIG. 4, a check is made at a step ST101 for the state of the SW1 flag. The flow of operation comes to a step ST102 if the SW1 flag is at "0" or comes to a step ST103 if the SW1 flag is at "1".

At the step ST102: If the switch SW1 which is provided for instructing the system controller 18 to make a check for the remaining amount of the electric power of the main power source 19 is in an on-state, the flow of operation comes to a step ST104. If the switch SW1 is found to be in an off-state, the flow comes back to the step ST101. At the step ST103: If the switch SW1 is found to be in the on-state, the flow comes to a step ST111. If the switch SW1 is in the off-state, the flow comes to a step ST110 to set the SW1 flag at "0" and then comes back to the above-stated step ST101.

At the step ST104: The SW1 flag is set at "1". At a step ST105: The W flag and the L flag are set at "0". After that, the power supply voltage value VC of the power from the subordinate power source 20 is detected. The flow then proceeds to a step ST106. At the step ST106: A check is made to find if the power supply voltage value VC which is detected at the step ST105 is lower than the first voltage value V1. If so, the flow comes to a step ST107. If the value VC is higher than the value V1, the flow comes to the step ST111. At the step ST107: If the power supply voltage value VC detected at the step ST105 is found to be lower than the second voltage value V2, the flow comes to a step ST108. If the value VC is higher than the value V2, the flow comes to a step ST109.

At the step ST108: The L flag is set at "1". After that, the display part 15 is caused to make a display indicating that the power supply voltage value VC is lower than the second voltage value V2. The flow then comes back to the step ST101. At the step ST109: The W flag is set at "1" and the display part 15 is caused to make a display indicating that the power supply voltage value VC is lower than the first voltage value V1 and the flow comes back to the step ST101.

With the switch SW1 for instructing the system controller 18 to make a check for the remaining amount of power of the main power source 19 operated at the operation part 17, the power supply voltage-of the subordinate power source 20 is detected and the remaining amount of power of the subordinate power source 20 is displayed at the display part 15 through the above-stated steps.

Next, at the step ST111, a check is made to find if the SW5 flag is at "0". If so, the flow comes to a step ST112. If the SW5 flag is at "1", the flow comes to a step ST113. At the step ST112: If the switch SW5 which indicates that the magnetic disc is loaded in a normal position on the recording and reproducing part 13 is found to be in an on-state, the flow comes to a step ST114. If the switch SW5 is in an off-state, the flow comes to a step ST116.

At the step ST114: The SW5 flag is set at "1". After that, the flow comes back to the step ST105. At the step ST113: If the switch SW5 is found to be in an on-state, the flow comes to the step ST116. If the switch SW5 is in an off-state, the flow comes to a step ST115.

At the step ST115: The SW5 flag is set at "0" and then the flow proceeds to the step ST116.

With the magnetic disc loaded in the normal position on the recording and reproducing part 13, the switch SW5 turns on. If not, the switch SW5 turns off.

At the step ST116: A check is made for the state of the switch SW2 which is provided for inhibiting acceptance of all instructions from other switches. If the switch SW2 is in an on-state, the flow comes to a step ST120. If the switch SW2 is found to be in an off-state, the flow comes to a step ST117. At the step ST120: The SW3 flag is set at "0". The SW4 flag is also set at "0". The flow then comes back to the step ST101.

With the switch SW2 which gives an instruction for inhibiting acceptance of instructions from other switches operated at the operation part 17, both the SW3 flag and the SW4 flag are set at "0", as described above. Under this condition, the apparatus is inhibited from performing any action until the switch SW2 is turned off, with the exception of that the result of detection of the power supply voltage of the subordinate power source 20 can be displayed in response to turning-on of the switch SW1.

Next, at the step ST117, if the SW3 flag is found to be at "0", with the above-stated switch SW2 in the off-state, the flow comes to a step ST118. If the SW3 flag is at "1", the flow comes to a step ST119.

At the step ST118: A check is made for the state of the switch SW3 which is provided for instructing the apparatus to operate in the recording mode. If the switch SW3 is found to be in an on-state, the flow comes to a step ST121. If the switch SW3 is in an off-state, the flow comes to a step ST123. At the step ST121: The SW3 flag is set at "1" and the SW4 flag at "0" and then the flow comes back to the step ST105.

With the switch SW3 which is provided for instructing the apparatus to operate in the recording mode operated at the operation part 17, the apparatus takes the recording mode. The power supply voltage of the subordinate power source 20 is detected in the same manner as described in the foregoing. The display part 15 displays the remaining amount of the electric power of the subordinate power source 20.

Further, at the step ST119: If the switch SW3 is found to be in the on-state, the flow comes to the step ST123. If the switch SW3 is in the off-state, the flow comes to the step ST122 to set the SW3 flag at "0" and, after that, comes to the step ST123.

Referring to FIG. 5, at the step ST123, the flow comes to a step ST125 if the SW4 flag is found to be at "1" or comes to a step ST124 if the SW3 flag is at "0". At the step ST124: A check is made for the state of the switch SW4 which is provided for instructing the apparatus to operate in the reproduction mode. The flow comes to a step ST126 if the switch SW4 is found to be in an on-state or to a step ST128 if the switch SW4 is in an off-state. At the step ST126: The SW3 flag is set at "0" and the SW4 flag at "1". The flow then comes back to the step ST105.

With the switch SW4 operated at the operation part 17 to instruct the apparatus to operate in the reproduction mode, the apparatus takes the reproduction mode. Then, in the same manner as described in the foregoing, the power supply voltage of the subordinate power source 20 is detected. The remaining amount of electric power of the subordinate power source 20 is displayed by the display part 15.

At the step ST125, a check is made for the state of the switch SW4. If the switch SW4 is found to be in an on-state, the flow comes to the step ST128. If the switch SW4 is in an off-state, the flow comes to a step ST127 to set the SW4 flag at "0" before it comes to the step ST128.

At the step ST128: A check is made for the state of the SW6 flag. If the SW6 flag is at "1", the flow comes to a step ST130. If the SW6 flag is at "0", the flow comes to a step ST129. At the step ST129: A check is made for the state of the switch SW6 which is provided for giving an instruction to cancel a standby state in the recording or reproduction mode. If the switch SW6 is found to be in an on-state, the flow comes to a step ST131 to set the SW6 flag at "1" and, after that, comes back to the step ST105. If the switch SW6 is in an off-state, the flow comes back to the step ST101.

At the step ST130: A check is made also for the state of the switch SW6. If the switch SW6 is found to be in the off-state, the flow comes to a step ST132 to set the SW6 flag at "0" before it comes back to the step ST101. If the switch SW6 is in the on-state, the flow comes to a step ST133. At the step ST133: A check is made for the state of the switch SW7 which is provided for giving an instruction to begin recording in the recording mode. If the switch SW7 is found to be in an on-state, the flow comes to a step ST134. If the switch SW7 is in an off-state, the flow comes back to the step ST101.

At the step ST134: A check is made for the state of the SW3 flag. If the SW3 flag is found to be at "1", the flow comes to a step ST135. If the SW3 flag is at "0", the flow comes back to the step ST101.

When a standby state is canceled with the switch SW6 operated while the apparatus is operating in the recording or reproduction mode, as described above, the power supply voltage of the subordinate power source 20 is detected and a display corresponding to the remaining amount of electric power of the subordinate power source 20 is made at the display part 15 in the same manner as described in the foregoing.

Further, while the standby state in the recording or reproduction mode has not been canceled with the switch SW6 not operated or while the standby state in the recording or reproduction mode has been canceled with the switch SW6 operated, if the switch SW7 is operated to give the instruction for a start of recording, the power supply voltage of the subordinate power source 20 can be detected and a display corresponding to the remaining amount of electric power of the subordinate power source 20 can be made by the display part 15 in the same manner as described above with the switch SW1 operated under this condition.

At the step ST135 which is shown in FIG. 6: With the switch SW7 having been operated to instruct the apparatus to start recording, a check is made for the state of the L flag. If the L flag is found to be at "0", the flow comes to a step ST136. If the L flag is at "1", the flow comes to a step ST142.

At the step ST136: A check is made for the state of the W flag. If the W flag is found to be at "0", the flow comes to a step ST137. If the W flag is at "1", the flow comes to a step ST138. At the steps ST137 and ST138: The power supply voltage value VC is detected and then the flow comes to steps ST139 and ST140, respectively.

At the step ST139: A check is made for the power supply voltage value VC detected at the step ST137. If the power supply voltage value VC is found to be lower than the first voltage value V1 mentioned in the foregoing, the flow comes to the step ST140. If the voltage value VC is higher than the first voltage value V1, the flow comes to a step ST141.

At the step ST141: The clock signal supplied from the clock circuit 16 is assumed to be correct and the system controller 18 causes the display part 15 to display the date or time of shooting according to the contents of the information data formed by the system controller 18 on the basis of the clock signal which is supplied from the clock circuit 16. The system controller 18 also causes the camera part 11, the recording signal processing part 12 and the recording and reproducing part 13 to perform a Sequence of recording actions. The information data corresponding to the date or time of shooting displayed at the display part 15 is supplied to the recording signal processing part 12. Upon receipt of the information data, the recording signal processing part 12 forms an ID signal by DPSK-modulating the information data. This ID signal is frequency-multiplexed with a still image signal which has been generated at the camera part 11 and undergone the frequency modulation process and the line-sequential converting process performed at the recording signal processing part 12. The frequency-multiplexed signals are recorded on a magnetic disc at the recording and reproduction part 13.

At the step ST140: The power supply voltage value VC detected at the step ST138 is compared with the second voltage value V2. The flow comes to a step ST142 if the value VC is lower than the value V2 or to the step ST141 if the value VC is higher than the value V2.

At the step ST142: Since the clock signal supplied from the clock circuit 16 might have been caused to be in error by the drop of the power supply voltage of the subordinate power source 20, all the contents of the information data formed at the system controller 18 are made to indicate "0" irrespective of the clock signal supplied from the clock circuit 16. Then, every part of the display of date (year, month and day) or time (hour, minute and second) of shooting to be made at the display part 15 is caused to be made as "0". At the same time, the system controller 18 causes the camera part 11, the recording signal processing part 12 and the recording and reproducing part 13 to perform the sequence of recording actions. The system controller 18 then supplies the recording signal processing part 12 with information data which corresponds to the date or time of shooting displayed as "0" at the display part 15. Upon receipt of the data, the recording signal processing part 12 forms an ID signal by DPSK-modulating the data. The ID signal is frequency-multiplexed with a still image signal which has been generated by the camera part 11 and undergone the frequency modulation process and the line-sequential process converting performed at the recording signal processing part 12. The frequency-multiplexed signals are then recorded on a magnetic disc at the recording and reproducing part 13.

Therefore, an ID signal having the same contents as those of the information data generated by the system controller 18 in accordance with the clock signal generated by the clock circuit 16 is recorded on the magnetic disc along with the still image signal when the power supply voltage (value VC) of the subordinate power source 20 shows a value higher than the first and second voltage values V1 and V2. However, if the power supply voltage shows a value lower than the second voltage value V2, all the contents of the display are shown as "0" and an ID signal having its contents indicating "0" is recorded on the magnetic disc along with the still image signal. This arrangement thus not only warns the operator of a drop in the power supply voltage of the subordinate power source 20 but also prevents any ID signal that shows erroneous contents from being recorded along with the still image signal as a result of the drop in the power supply voltage.

As described above, this embodiment is arranged to automatically detect the power supply voltage of the subordinate power source 20 according to the state of switch operation performed at the operation part 17 and to make a display showing the remaining amount of electric power at the display part 15. Further, in a case where the power supply voltage of the subordinate power source 20 shows a value higher than the first and second voltage values V1 and V2, the clock signal from the clock circuit 16 is assumed to be generated in a normal state. Then, an ID signal having the same contents as those of the information data formed by the system controller 18 in accordance with the clock signal is recorded on a magnetic disc along with the still image signal. If the power supply voltage shows a value lower than the second voltage value V2, an ID signal having all the contents thereof indicating "0" is arranged to be recorded on the magnetic disc along with the still image signal. This arrangement warns the operator of a drop in the power supply voltage of the subordinate power source 20 and also prevents any ID signal that has erroneous contents due to the drop in power supply voltage from being recorded along with the still image signal.

The second embodiment is arranged, as described above, to make a display with all its contents showing "0" and to record an ID signal having all the contents thereof also showing "0" on a magnetic disc along with the still image signal in cases where the power supply voltage value VC of the subordinate power source 20 is found to be lower than the second voltage value V2. However, this arrangement may be changed to have all the contents of the display in blank and those of the ID signal also in blank in recording the ID signal along with the still image signal.

In the second embodiment, the system controller 18 is used for forming the information data indicating the date (year, month and day) or time (hour, minute and second) of shooting in accordance with the clock signal supplied from the clock circuit 16. However, in a case where a system controller which only forms the information data indicating the year, month, day, hour and minute of shooting in accordance with the clock signal is used, information data indicating second may be generated to show "00" in such a manner that the display part 15 makes the display of second always as "00" and the content of the ID signal indicating second is recorded always as "00" along with the still image signal.

Further, while the second embodiment is arranged to give a warning by causing all the display elements of the display part 15 which are used for displaying the date or time of shooting to show "0" in a case where the power supply voltage value VC of the subordinate power source 20 is found to be lower than the second voltage value V2, that arrangement may be changed, for example, as follows: the display elements for the date or time of shooting are arranged to show "LB" as a warning display indicating that the power supply voltage value VC is lower than the second voltage value V2. It is also possible to use some other display elements for a warning display indicating that the value VC is lower than the value V2.

The arrangement of the second embodiment which has been described above enables an image signal recording and reproducing system to warn the operator of the possibility of a faulty action due to consumption of the battery and to prevent any erroneous information from being multiplexed and recorded with the image signal by the faulty action.

What is claimed is:

1. An image information recording system for recording on a recording medium image information together with other information corresponding to the image information, comprising:

a) data generating means for generating data corresponding to said other information;

b) first power supply means for independently supplying power to said data generating means;

c) second power supply means for supplying power to other parts of said image information recording system than said data generating means;

d) data generation control means for controlling said data generating means so as to generate, when the level of the power supplied to said data generating means by said first power supply means becomes lower than a predetermined value in the state that the power is normally being supplied from said second power supply means to said other parts of said image information recording system, predetermined data of the same kind as data generated by said data generating means, said predetermined data representing information different from that relative to the power supply of said first supply means; and e) recording means arranged to receive the image information and record on the recording medium information conforming to the contents of the data generated by said data generating means together with said received image information.

2. A system according to claim 1, further comprising display means for displaying information conforming to contents of data generated by said data generating means.

3. A system according to claim 1, wherein said other information includes date information indicative of year, month and day which correspond to the image information.

4. A system according to claim 1, wherein said other information includes time information indicative of hour, minute and second which correspond to the image information.

5. A system according to claim 1, wherein said first power supply means includes a battery and said data generation control means controls said data generating means so as to generate, when the level of the power supplied from said battery to said data generating means becomes lower than a predetermined value in the state that the power is normally being supplied from said second power supply means to said other parts of said image information recording system, predetermined data of the same kind as data generated by said data generating means, said predetermined data representing information different from that relative to the power supply of said battery.

6. A system according to claim 1, wherein said data of predetermined contents generated by said data generating means has a content indicative of all zero.

7. A system according to claim 1, wherein said data of predetermined contents generated by said data generating means has content indicative of blank.

8. A system according to claim 1, wherein said recording means is arranged to record information conforming to contents of data generated by said data generating means in an area where the image information is to be recorded on the recording medium.

9. An image information recording system for recording on a recording medium an image signal along with an information signal corresponding to said image signal, comprising:

a) information data generating means for generating information data;

b) first power supply means for independently supplying power to said information data generating means;

c) second power supply means for supplying power to other parts of said image information recording system than said information data generating means;

d) data generation control means for controlling said information data generating means so as to generate, when the level of the power supplied to said information data generating means by said first power supply means becomes lower than a predetermined value in the state that the power is normally being supplied from said second power supply means to said other parts of said image information recording system, predetermined data of the same kind as data generated by said information data generating means, said predetermined data representing information different from that relative to the power supply of said first power supply means; and e) recording means arranged to receive the image signal, generate an information signal conforming to the contents of the information data generated by said information data generating means along with the received image signal, and to record on said recording medium said information signal thus generated.

10. A system according to claim 9, further comprising display means for displaying information conforming to contents of data generated by said information data generating means.

11. A system according to claim 9, wherein the information data includes date information data indicative of year, month and day which correspond to the image signal.

12. A system according to claim 9, wherein the information data includes time information data indicative of hour, minute and second which correspond to the image signal.

13. A system according to claim 9, wherein said first power supply means includes a battery, and said data generation control means controls said information data generating means so as generate, when the level of the power supplied from said battery to said information data generating means becomes lower than said predetermined value in the state that the power is normally being supplied from said second power supply means to said other parts of said image information recording system, predetermined data of the same kind as data generated by said information data generating means, said predetermined data representing information different from that relative to the power supply of said battery.

14. A system according to claim 9, wherein said first power supply means includes a battery, and said data generation control means controls said information data generating means so as to generate, when the level of the power supplied from said battery to said information data generating means becomes lower than said predetermined value in the state that the power is normally being supplied from said second power supply means to said other parts of said image information recording system, data indicative of all zeroes of the same king as data generated by said information data generating means, said data indicative of all zeroes representing information different from that relative to the power supply said battery.

15. A system according to claim 9, wherein said first power supply means includes a battery, and said data generation control means controls said information data generating means so as to generate, when the level of the power supplied from said battery to said information data generating means becomes lower than said predetermined value in the state that the power is normally being supplied from said second power supply means to said other parts of said image information recording system, data indicative of blanks of the same kind as data generated by said information data generating means, said data indicative of blank representing information different from that relative to the power supply of said battery.

16. A system according to claim 9, wherein said recording means is arranged to record an information signal conforming to contents of information data generated by said information data generating means in an area where the image signal is to be recorded on the recording medium.

17. A system according to claim 9, wherein said recording means includes multiplexing means for multiplexing an information signal conforming to information data generated by said information data generating means with the image signal and records the image signal multiplexed with the information signal by said multiplexing means on the recording medium.

18. A system according to claim 9, wherein said recording means includes frequency-multiplexing means for frequency-multiplexing an information signal conforming to information data generated by said information data generating means with the image signal and records the image signal frequency multiplexed with said information signal by said frequency-multiplexing means on the recording medium.

19. A system according to claim 9, further comprising image signal generating means for generating the image signal.

20. A system according to claim 19, wherein said image signal generating means includes an image sensor.

21. An image information recording system for recording on a recording medium image information together with other information corresponding to the image information, comprising:

a) data generating means for generating data corresponding to said other information;

b) first power supply means for independently supplying power to said data generating means;

c) second power supply means for supplying power to other parts of said image information recording system than said data generating means;

d) operation instructing means for instructing said system to start various operations of said system;

e) data generation control means arranged to detect, in the state that the power is normally being supplied from said second power supply means to said other parts of said image information recording system, a level of the power supplied from said first power supply means to said data generating means in response to the timing of an instruction given by said operation instructing means to start a predetermined operation, and to control said data generating means so as to generate, when the detected level of the power becomes lower than a predetermined value, predetermined data of the same king as data generated by said data generating means, said predetermined data representing information different from that relative to the power supply of said first power supply means; and f) display means for displaying information conforming to the content of said data generated by said data generating means.

22. A system according to claim 21, further comprising recording means for recording information conforming to contents of data generated by said data generating means on the recording medium along with the image information.

23. A system according to claim 22, wherein said recording means is arranged to record information conforming to contents of data generated by said data generating means in an area where the image information is to be recorded on the recording medium.

24. A system according to claim 21, wherein said other information includes date information indicative of year, month and day which correspond to the image information.

25. A system according to claim 21, wherein said other information includes time information indicative of hour, minute and second which correspond to the image information.

26. A system according to claim 21, wherein said first power supply means includes a battery, and said data generation control means detects, in the state that the power is normally being supplied from said second power supply means to said other parts of said image information recording system, a level of the power supplied from said battery to said data generating means in response to the timing of an instruction given for a predetermined operation by said operation instructing means and controls said data generating means so as to generate, when the detected level of the power becomes lower than said predetermined value, predetermined data of the same kind as data generated by said data generating means, said predetermined data representing information different from that relative to the power supply of said battery.

27. A system according to claim 21, wherein said data generation control means detects, in the state that the power is normally being supplied from said second power supply means to said other parts of said image information recording system, a level of the power supplied from said first power supply means to said data generating means in response to the timing of an instruction given by said operation instructing means for prohibiting acceptance of other instructions given by said operation instructing means, and controls said data generating means so as to generate, when the detected level of the power becomes lower than said predetermined value, predetermined data of the same kind as data generated by said data generating means, said predetermined data representing information different from that relative to the power supply of said first power supply means.

28. A system according to claim 21, wherein said data generation control means detects, in the state that the power is normally being supplied from said second power supply means to said other parts of said image information recording system, a level of the power supplied from said first power supply means to said data generating means in response to the timing of an instruction given for a stand-by operation by said operation instructing means, and controls said data generating means so as to generate, when the detected level of the power becomes lower than said predetermined value, predetermined data of the same kind as data generated by said data generating means, said predetermined data representing information different from that relative to the power supply of said first power supply means.

29. A system according to claim 21, wherein said data generation control means detects, in the state that the power is normally being supplied from said second power supply means to said other parts of said image information recording system, a level of the power supplied from said first power supply means to said data generating means in response to the timing of an instruction given by said operation instructing means for starting a recording operation, and controls said data generating means so as to generate, when the detected level of the power becomes lower than said predetermined value, predetermined data of the same kind as data generated by said data generating means, said predetermined data representing information different from that relative to the power supply of said first power supply means.

30. A system according to claim 21, wherein said data generation control means detects, in the state that the power is normally being supplied from said second power supply means to said other parts of said image information recording system, a level of the power supplied from said first power supply means to said data generating means in response to the timing of an instruction given for a predetermined operation by said operation instructing means, and controls said data generating means so as to generate, when the detected level of the power becomes lower than said predetermined value, data indicative of all zeroes of the same kind as data generated by said data generating means, said data indicative of all zeroes representing information different from that relative to the power supply of said first power supply means.

31. A system according to claim 21, wherein said data generation control means detects, in the state that the power is normally being supplied from said second power supply means to said other parts of said image information recording system, a level of the power supplied from said first power supply means to said data generating means in response to the timing of an instruction given for a predetermined operation by said operation instructing means, and controls said data generating means so as to generate, when the detected level of the power becomes lower than said predetermined value, data indicative of blanks of the same kind as data generated by said data generating means, said data indicative of blanks representing information different from that relative to the power supply of said first power supply means.

32. A system according to claim 21, wherein said data generation control means detects, in the state that the power is normally being supplied from said second power supply means to said other parts of said image information recording system, a level of the power supplied from said first power supply means to said data generating means in response to the timing of an instruction given for a predetermined operation by said operation instructing means, and controls said data generating means so as to generate, when the detected level of the power becomes lower than said predetermined value, data indicative of warning of the same kind as data generated by said data generating means, said data indicative of warning representing information different from that relative to the power supply of said first power supply means.

33. An image signal recording and reproducing system for recording on a recording medium an image signal and an information signal corresponding to said image signal, and reproducing an image signal and an information signal corresponding to said image signal from the recording medium, comprising:

a) information data generating means for generating information data;

b) first power supply means for independently supplying power to said information data generating means;

c) second power supply means for supplying power to other parts of said image signal recording and reproducing system than said information data generating means;

d) operation instructing means for instructing said system to start various operations of said system;

e) data generation control means for detecting, in the state that the power is normally being supplied from said second power supply means to said other parts of said image signal recording and reproducing system, a level of the power supplied from said first power supply means to said information data generating means in response to the timing of an instruction given by said operation instructing means for starting a predetermined operation among the various operations, and for controlling said information data generating means so as to generate, when the detected level of the power becomes lower than a predetermined value, predetermined data of the same kind as data generated by said information data generating means, said predetermined data representing information different from that relative to the power supply of said first power supply means;

f) display means for displaying according to the contents of information data generated by said information data generating means.

34. A system according to claim 33, wherein said information data includes date information data indicative of year, month and day which correspond to the image signal.

35. A system according to claim 33, wherein said information data includes time information data indicative of hour, minute and second which correspond to the image signal.

36. A system according to claim 33, wherein said first power supply means includes a battery, and said data generation control means detects, in the state that the power is normally being supplied from said second power supply means to said other parts of said image signal recording and reproducing system, a level of the power supplied from said battery to said information data generating means in response to the timing of an instruction given by said operation instructing means for a detection operation which detects a remaining amount of power in said battery, and controls said information data generating means so as to generate, when the detected level of the power becomes lower than said predetermined value, predetermined data of the same kind as data generated by said information data generating means, said predetermined data representing information different from that relative to the power supply of the battery.

37. A system according to claim 33, wherein said data generation control means detects, in the state that the power is normally being supplied from said second power supply means to said other parts of said image signal recording and reproducing system, a level of the power supplied from said first power supply means to said information data generating means in response to the timing of an instruction given said operation instructing means for rejecting receipt of other instructions given by said operation instructing means, and controls said information data generating means so as to generate, when the detected level of the power becomes lower than said predetermined value, predetermined data of the same kind as data generated by said information data generating means, said predetermined data representing information different from that relative to the power supply of said first power supply means.

38. A system according to claim 33, wherein said data generation control means detects, in the state that the power is normally being supplied from said second power supply means to said other parts of said image signal recording and reproducing system, a level of the power supplied from said first power supply means to said information data generating means in response to the timing of an instruction given for a standby operation by said operation instructing means, and controls said information data generating means so as to generate, when the detected level of the power becomes lower than said predetermined value, predetermined data of the same kind as data generated by said information data generating means, said predetermined data representing information different from that relative to the power supply of said first power supply means.

39. A system according to claim 33, wherein said data generation control means detects, in the state that the power is normally being supplied from said second power supply means to said other parts of said image signal recording and reproducing system, a level of the power supplied from said first power supply means to said information data generating means in response to the timing of an instruction given by said operation instructing means for starting a recording operation, and controls said information data generating means so as to generate, when the detected level of the power becomes lower than said predetermined value, predetermined data of the same kind as data generated by said information data generating means, said predetermined data representing information different from that relative to the power supply of said first power supply means.

40. A system according to claim 33, wherein said data generation control means detects, in the state that the power is normally being supplied from said second power supply means to said other parts of said image signal recording and reproducing system, a level of the power supplied from said first power supply means to said information data generating means in response to the timing of an instruction given for a predetermined operation by said operation instructing means, and controls said information data generating means so as to generate, when the detected level of the power becomes lower than said predetermined value, data indicative of all zeroes of the same kind as data generated by said information data generating means, said data indicative of all zeroes representing information different from that relative to the power supply of said first power supply means.

41. A system according to claim 33, wherein said data generation control means detects, in the state that the power is normally being supplied from said second power supply means to said other parts of said image signal recording and reproducing system, a level of the power supplied from said first power supply means to said information data generating means in response to the timing of an instruction given for a predetermined operation by said operation instructing means, and controls said information data generating means so as to generate, when the detected level of the power becomes lower than said predetermined value, data indicative of blanks of the same kind as data generated by said information data generating means, said data indicative of blanks representing information different from that relative to the power supply of said first power supply means.

42. A system according to claim 33, wherein said data generation control means detects, in the state that the power is normally being supplied from said second power supply means to said other parts of said image signal recording and reproducing system, a level of the power supplied from said first power supply means to said information data generating means in response to the timing of an instruction given for a predetermined operation by said operation instructing means, and controls said information data generating means so as to generate, when the detected level of the power becomes lower than said predetermined value, data indicative of warning of the same kind as data generated by said information data generating means, said data indicative of warning representing information different from that relative to the power supply of said first power supply means.

43. A system according to claim 33, further comprising recording means for recording an information signal conforming to contents of the information data generated by said information data generating means on the recording medium along with the image signal.

44. A system according to claim 43, wherein said recording means is arranged to record the information signal conforming to contents of the information data generated by said information data generating means in an area where the image signal is to be recorded on the recording medium.

45. A system according to claim 43, wherein said recording means includes multiplexing means for multiplexing the information signal conforming to contents of the information data generated by said information data generating means with the image signal and records the image signal multiplexed with said information by said multiplexing means on the recording medium.

46. A system according to claim 43, wherein said recording means includes frequency multiplexing means for frequency-multiplexing an information signal conforming to contents of information data generated by said information data generating means with the image signal and records the image signal frequency-multiplexed with said information signal by said frequency-multiplexing means on the recording medium.

47. A system according to claim 43, further comprising image signal generating means for generating the image signal.

48. A system according to claim 47, wherein said image signal generating means includes an image sensor.

49. A system according to claim 43, further comprising reproduction means for reproducing the image signal and the information signal recorded on the recording medium.

50. A system according to claim wherein said data generation control means detects, in the state that the power is normally being supplied from said second power supply means to said other parts of said image signal recording and reproducing system, a level of the power supplied from said first power supply means to said information data generating means in response to the timing of an instruction given by said operation instructing means for starting a recording operation, and controls said information data generating means so as to generate, when the detected level of the power becomes lower than said predetermined value, predetermined data of the same kind as data generated by said information data generating means, said predetermined data representing information different from that relative to the power supply of said first power supply means.

51. A system according to claim wherein said data generation control means detects, in the state that the power is normally being supplied from said second power supply means to said other parts of said image signal recording and reproducing system, a level of the power supplied from said first power supply means to said information data generating means in response to the timing of an instruction given by said operation instructing means for starting a reproducing operation, and controls said information data generating means so as to generate, when the detected level of the power becomes lower than said predetermined value, predetermined data of the same kind as data generated by said information data generating means, said predetermined data representing information different from that relative to the power supply of said first power supply means.

* * * * *

UNITED STATES PATENT AND TRADEMARK OFFICE
CERTIFICATE OF CORRECTION

PATENT NO. : 5,727,114
DATED : March 10, 1998
INVENTOR(S) : Okada, Masaki

It is certified that error appears in the above-identified patent and that said Letters Patent is hereby corrected as shown below:

| | | | | |
|---|---|---|---|---|
| Col. 2, | line 43, | delete | ".generating" | and insert -- generating --. |
| Col. 9, | line 3, | delete | "Value" | and insert -- value --. |
| Col. 12, | line 22, | delete | "Sequence" | and insert -- sequence --. |
| Col. 22, | line 9, | after | "claim" | insert -- 49 --. |
| Col. 22, | line 24, | after | "claim" | insert -- 49 --. |

Signed and Sealed this

Twenty-fifth Day of August, 1998

Attest:

BRUCE LEHMAN

Attesting Officer

Commissioner of Patents and Trademarks